United States Patent
Dropps et al.

(10) Patent No.: US 11,314,637 B2
(45) Date of Patent: Apr. 26, 2022

(54) SYSTEM AND METHOD FOR EFFICIENT CACHE COHERENCY PROTOCOL PROCESSING

(71) Applicant: HEWLETT PACKARD ENTERPRISE DEVELOPMENT LP, Houston, TX (US)

(72) Inventors: Frank R. Dropps, Eagan, MN (US); Thomas McGee, Chippewa Falls, WI (US); Michael Malewicki, Chippewa Falls, WI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 168 days.

(21) Appl. No.: 16/888,123

(22) Filed: May 29, 2020

(65) Prior Publication Data

US 2021/0374050 A1 Dec. 2, 2021

(51) Int. Cl.
*G06F 12/02* (2006.01)
*G06F 12/084* (2016.01)
*G06F 9/38* (2018.01)
*G06F 9/54* (2006.01)
*G06F 12/123* (2016.01)

(52) U.S. Cl.
CPC ........ *G06F 12/0246* (2013.01); *G06F 9/3842* (2013.01); *G06F 9/546* (2013.01); *G06F 12/084* (2013.01); *G06F 12/123* (2013.01); *G06F 2212/1024* (2013.01)

(58) Field of Classification Search
CPC .. G06F 12/0246; G06F 12/084; G06F 12/123; G06F 9/3842; G06F 9/546; G06F 2212/1024; G06F 3/06–0689
See application file for complete search history.

(56) References Cited

U.S. PATENT DOCUMENTS

| | | | |
|---|---|---|---|
| 7,386,674 B1* | 6/2008 | Lango | G06F 3/061 711/137 |
| 2003/0033477 A1* | 2/2003 | Johnson | G06F 3/0601 711/114 |
| 2015/0193155 A1* | 7/2015 | Sarcone | G06F 12/0862 714/764 |
| 2017/0097897 A1* | 4/2017 | Saito | G06F 12/0873 |
| 2019/0129884 A1* | 5/2019 | Dropps | G06F 15/17343 |

* cited by examiner

*Primary Examiner* — Nicholas J Simonetti
(74) *Attorney, Agent, or Firm* — Sheppard Mullin Richter & Hampton LLP

(57) ABSTRACT

To reduce latency and bandwidth consumption in systems, systems and methods are provided for grouping multiple cache line request messages in a related and speculative manner. That is, multiple cache lines are likely to have the same state and ownership characteristics, and therefore, requests for multiple cache lines can be grouped. Information received in response can be directed to the requesting processor socket, and those speculatively received (not actually requested, but likely to be requested) can be maintained in queue or other memory until a request is received for that information, or until discarded to free up tracking space for new requests.

20 Claims, 10 Drawing Sheets

| COHERENCY DIRECTORY TAG 304 | |
|---|---|
| # | Upper Addresses |
| 1 | Upper Address - A |
| 2 | Upper Address - B |
| ... | ... |
| 4 | Upper Address - N |

TCAM 306

FIG. 3B

SRAM 305

State Information 310

| # | Valids | State Info. | Sharing Vector / Ownership |
|---|--------|-------------|----------------------------|
| 1 | 1111 | Shared | Sharing Info. |
| 2 | 0000 | Invalid | |
| 3 | 0011 | Exclusive | Ownership Info. |
| 4 | 0010 | Exclusive | Ownership Info. |

FIG. 3C

SYSTEM AND METHOD FOR EFFICIENT CACHE COHERENCY PROTOCOL PROCESSING

BACKGROUND

In symmetric multiprocessing (SMP) systems, multiple processors are configured to share a common operating system and memory resources. A single copy of the operating system manages all of the processor in the system. SMP is also referred to as "tightly coupled multiprocessing" because all of the processor are connected via a shared bus or network and have access to the same shared memory resource. The throughput of an SMP system is higher than single-processor systems as all the processors are running in parallel. Moreover, reliability is increased. If a processor socket were to fail (e.g., a short on that processor's board) that processor's workload can be distributed amongst the other sockets, whereas if the processor in a single-processor fails, the system fails.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 3B is a schematic representation of an example TCAM in accordance with one embodiment of the technology disclosed herein.

FIG. 3C is a schematic representation of an example SRAM in accordance with one embodiment of the technology disclosed herein.

Figure 1:
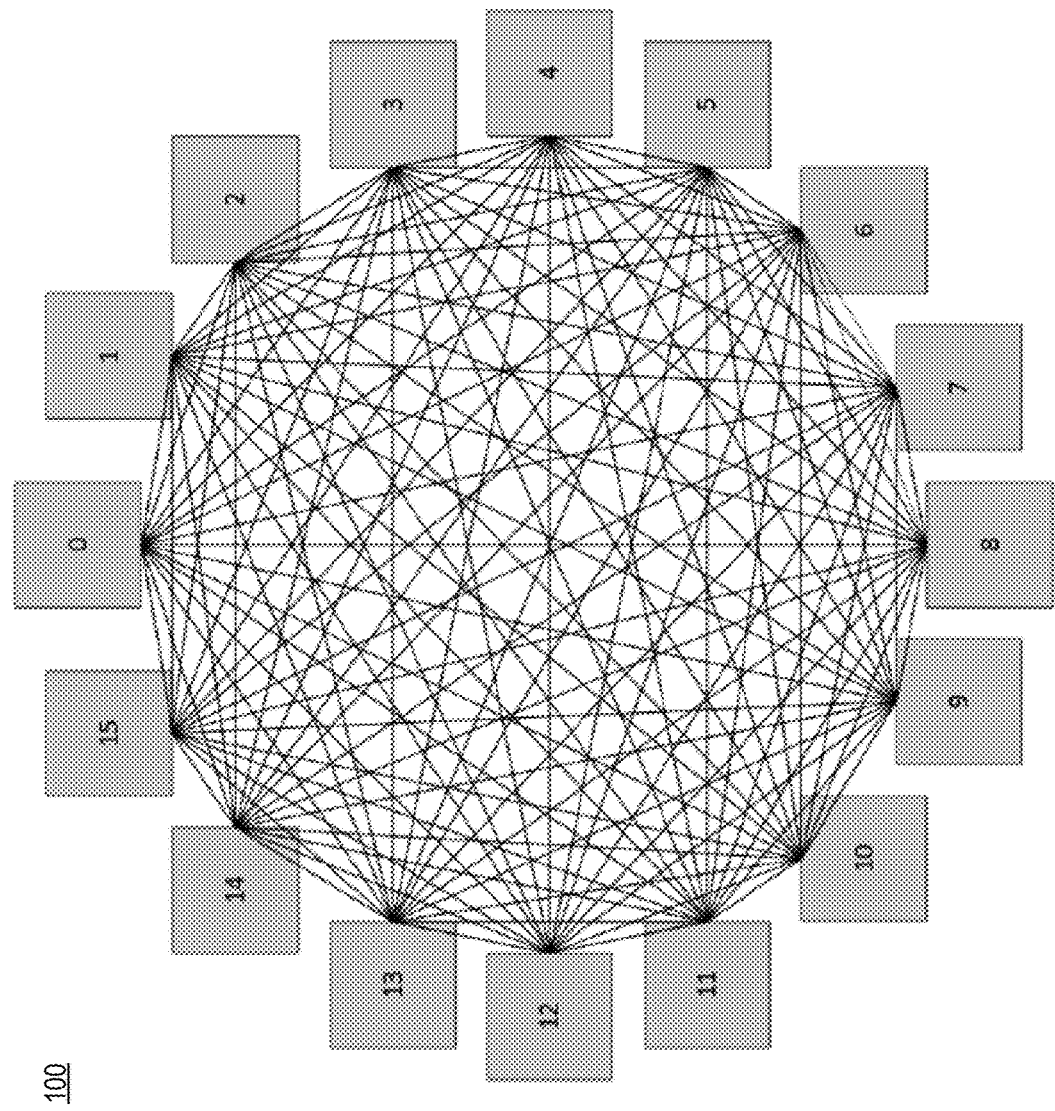
FIG. 1 is an example architecture in accordance with embodiments of the technology disclosed herein

The figures are not exhaustive and do not limit the present disclosure to the precise form disclosed.

DETAILED DESCRIPTION

Non-uniform memory access (NUMA) is a memory design for SMP systems. Generally, a NUMA architecture includes a plurality of nodes interconnected over an SMP bus or network. Each node itself is a small-scale SMP, comprising several processor sockets and associated memory interconnected amongst themselves, with the memory within the node being shared by all of the processor sockets. Memory within a node may be considered local memory to the processors of the node, while memory of other nodes may be considered remote memory. Node controllers within each node enable the processor sockets to access remote memory within the system. A node controller may be considered an advanced memory controller, managing access to some or all of the local memory and the node's processor sockets access to remote memory.

Because of the manner in which memory is implemented, each of the node controllers participate in the cache coherency protocol for the system. Cache coherency is an important concept in multiprocessor, multi-socket systems comprising a plurality of discrete processor sockets or processor chips. Cache coherency can entail ensuring uniformity in data blocks, meaning that any variable that is to be used has a consistent value across all local caches. In this regard, a coherency directory may include entry information to track the state and ownership of each memory block that may be shared between processors in a multiprocessor shared memory system. Because a coherency directory may be too large to be stored on a node controller, the coherency directory can be stored in host memory, and a node controller may use a coherency directory cache for fast access/reduced bandwidth impact on a processor.

To the above, a coherency directory cache may be described as a component that stores a subset of the coherency directory entries providing for faster access and increased data bandwidth. For directory-based coherence, the coherency directory cache may be used by a node controller (also referred to as a hub) to manage communication between different nodes of a computer system or different computer systems. In this regard, the coherency directory cache may track the state and ownership of each cache block (or cache line) for the computer system or the different computer systems. For example, the coherency directory cache may track which of the nodes of the computer system or of different computer systems are sharing a cache block.

A coherency directory cache may include information related to a plurality of memory blocks. The size of these memory blocks may be defined for ease of implementation to be the same as system cache lines for a computer system. These cache line sized memory blocks for discussion clarity may be referred to as cache lines. The cache line information may identify a processor (or another device) at which the cache line is stored in the computer system (or different computer systems). The coherency directory and coherency directory cache may include a coherency state and ownership information associated with each of the system memory cache lines. As the number of cache lines increases, the size of the coherency directory and likewise the coherency directory cache may similarly increase.

To reduce latency and bandwidth consumption in systems, where link bandwidth between node controllers may fall well short of the link bandwidth between node controllers and processor sockets, multiple cache line request messages can be grouped in a related and speculative manner. That is, multiple cache lines are likely to have the same state and ownership characteristics, and therefore, requests for multiple cache lines can be grouped. Information received in response can be directed to the requesting processor socket, and those speculatively received (not actually requested, but likely to be requested) can be maintained in a first-in-first-out queue (or simply, "FIFO") or other memory until a request is received for that information, or until discarded to free up tracking space for new requests.

For example, upon receipt of a memory operation request, such as a read operation at a local processor socket, and remote messaging is required to execute/facilitate that read operation (e.g., the local processor socket is to request the target data of the read operation from a processor socket of a remote node), a block request can be sent instead of a single request. That is, requests for multiple memory blocks/cache lines that have the same or are likely to have the same state and ownership of the actually requested memory block/cache line are also sent to the remote node. In this way, requests for those as-of-yet-unrequested memory blocks/cache lines will have already been retrieved via a single request operation, rather than multiple request operations that would introduce latency and consume bandwidth. It should be noted that memory is typically allocated to applications in block sizes larger than a single cache line making it, at least at times, likely that multiple memory blocks/cache lines have the same state and ownership characteristics.

FIG. 1 illustrates an example architecture 100 in accordance with embodiments of the present disclosure. Example architecture 100 is provided for illustrative purposes only, and should not be interpreted as limiting the scope of the subject matter disclosed herein to architecture 100. A person of ordinary skill in the art would know that embodiments of the technology disclosed herein are applicable to any multiprocessing system with shared memory resources. As illustrated in FIG. 1, architecture 100 comprises 16 nodes. In various embodiments, more than 16 nodes may be included within architecture 100. Each node (0-15) is connected to every other node within architecture 100. In various embodiments, a node may be directly connected to one or more nodes as depicted in architecture 100, while in other embodiments a node may be connected to one or more nodes through other devices, including but not limited to routers and switches. In various embodiments, each node (0-15) may include one or more processors and one or more node controllers (not shown in FIG. 1), which is an advanced memory controller configured to enable processors within each node to access memory on all the other nodes.

Figure 2:
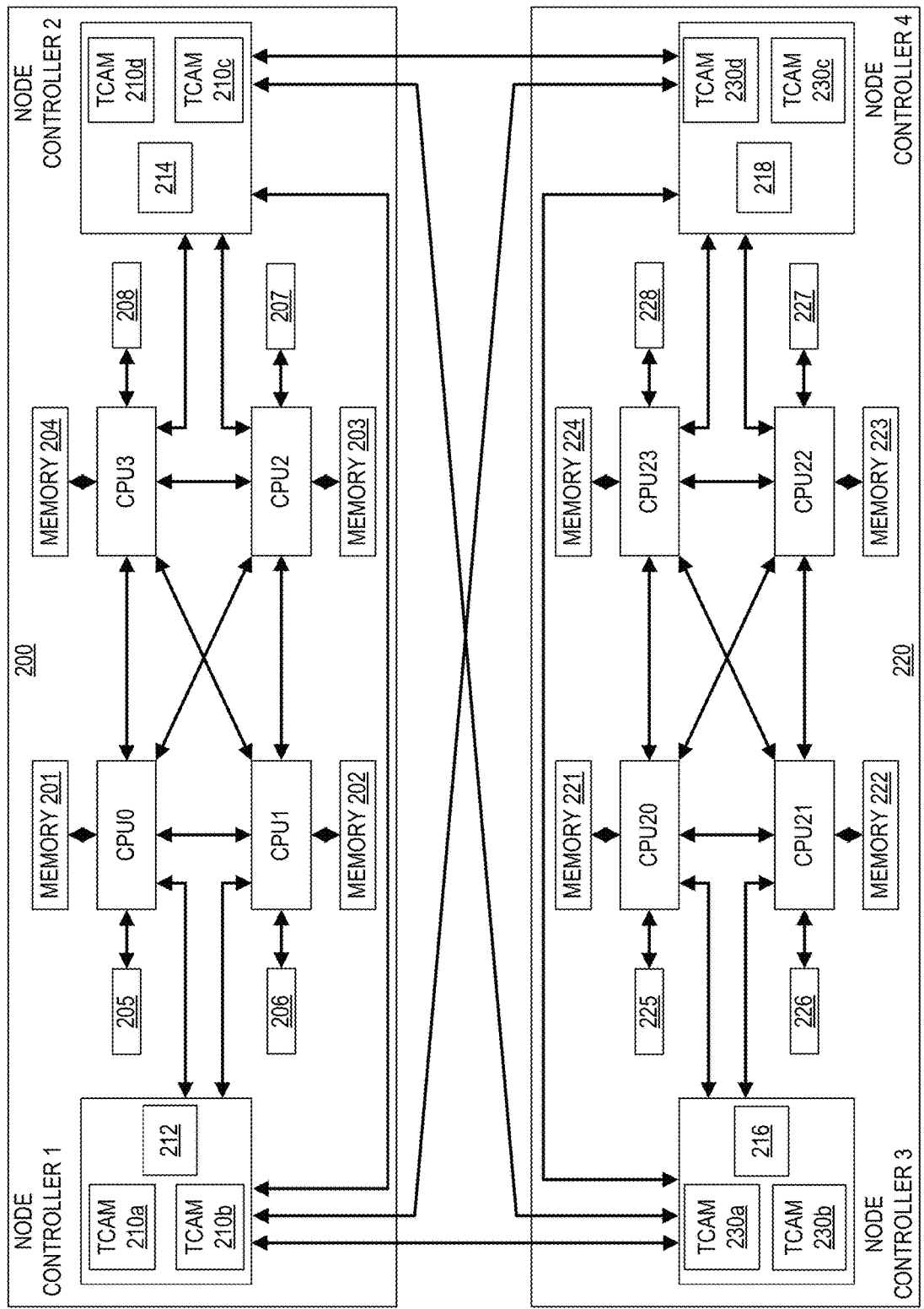
FIG. 2 is an example multiple processor system in accordance with embodiments of the technology disclosed herein.

FIG. 2 illustrates example nodes 200 and 220 (also referred to as socket groups) in accordance with embodiments of the present disclosure. In various embodiments, each of nodes/socket groups 200 and 220 may represent one or more of the nodes (0-15) discussed with respect to FIG. 1. Nodes 200 and 220 are provided for illustrative purposes only and should not be interpreted as limiting the scope of the technology discussed herein to only nodes 200 and 220. Nodes 200 and 220 show only those components relevant to explaining the technology of the present disclosure, and a person of ordinary skill in the art would know how to implement common components of processing systems omitted from nodes 200 and 220.

In various embodiments, each of nodes 200 and 220 may be implemented as a single integrated circuit, including but not limited to an application specific integrated circuit (ASIC), a field programmable gate array (FPGA), a programmable logic array (PLA), complex programmable logic device (CPLD), or other integrated circuit component. In some embodiments, node 200 may comprise a printed circuit board (PCB) or multi-chip module with a plurality of chipsets disposed therein. As illustrated, node 200 includes four processor sockets (or simply processors) CPU0, CPU1, CPU2, CPU3, while node or socket group 220 includes its own four processor sockets or processors CPU20, CPU21, CPU22, CPU23. Each of these processors may contain one or more processor cores. Node 200 and node 220 may each have a similar structure to an SMP system, with each processor CPU0, CPU1, CPU2, CPU3 communicatively coupled to each other and having access to each memory 201, 202, 203, 204. Likewise, each of processors CPU20, CPU21, CPU22, CPU23 is communicatively coupled to each other and have access to each memory 221, 222, 223, 224. Nodes or socket groups 200 and 220 may be coupled to each other via node controllers 1, 2, 3, and 4.

In various embodiments, memory 201, 202, 203, 204, 221, 222, 223, 224 may comprise one or more types of non-transitory machine-readable storage media, including but not limited to: solid state storage devices (SSDs), single in-line memory modules (SIMMs), dual in-line memory modules (DIMMs), dynamic random-access memory (DRAM), static random-access memory (SRAM), among other common types of computer memory.

Each processor CPU0, CPU1, CPU2, CPU3, CPU20, CPU21, CPU22, CPU23 manages its respective memory component. Requests for data stored on memory 201, 202, 203, 204, 221, 222, 223, 224 are directed to the respective processor CPU0, CPU1, CPU2, CPU3, CPU20, CPU21, CPU22, CPU23. As a non-limiting example, if CPU2 needs a data block at an address in local memory 204, CPU2 may send a request to CPU3 to retrieve the requested data block and provide the data block to CPU2. In various embodiments, each memory 201, 202, 203, 204, 221, 222, 223, 224 may have an associated memory controller configured to control access to the data blocks of its respective memory component. Each memory controller may be implemented as a specialized logic circuit in some embodiments.

Although illustrated with each memory 201, 202, 203, 204 directly connected to one processor CPU0, CPU1, CPU2, CPU3, and each memory 221, 222, 223, 224 directly connected to one processors CPU20, CPU21, CPU22, CPU23, a person of ordinary skill in the art would know that in some embodiments each processor socket CPU0, CPU1, CPU2, CPU3, CPU20, CPU21, CPU22, CPU23 may be connected to one or more memory components. As a non-limiting example, CPU0 and CPU3 may be connected to memory 201, allowing both processors CPU0, CPU3 to directly access memory 201.

Memory 201, 202, 203, 204 combine with the local memories of other nodes within the system to form a shared main memory having a global address space, in this example, and as described above, memory 221, 222, 223, 224. In various embodiments, memory 201, 202, 203, 204 may be combined into a local node (200) memory, and memory 221, 222, 223, 224 of other nodes (220) in the system may be considered remote memory and vice-versa (relative to each other). Each memory 201, 202, 203, 204, 221, 222, 223, 224 may be a logical portion of the shared main memory, similar to a Level 3 cache. In various embodiments, each processor CPU0, CPU1, CPU2, CPU3, CPU20, CPU21, CPU22, CPU23 may include dedicated CPU cache (i.e., Level 1 cache, Level 2 cache) (not shown in FIG. 2) for storing copies of frequently used data from local memory (i.e., the combination of memory 201, 202, 203, 204 and the combination of memory 221, 222, 223, 224, respectively) or remote memory (i.e., memories associated with remote nodes, e.g., node 200 relative to node 220 and vice-versa).

In various embodiments, each processor socket CPU0, CPU1, CPU2, CPU3, CPU20, CPU21, CPU22, CPU23 may have a dedicated cache 205, 206, 207, 208, 225, 226, 227, 228, comprising smaller, faster hardware memory associated with a respective processor CPU0, CPU1, CPU2, CPU3, CPU20, CPU21, CPU22, CPU23 respectively. Caches 205, 206, 207, 208, 225, 226, 227, 228 may be implemented in a variety of cache architectures, including but not limited to a set associative cache, a fully associative cache, a direct-mapped cache schematics, among other cache architectures common in the art. In some embodiments, caches 205, 206, 207, 208, 225, 226, 227, 228 may be implemented within processors CPU0, CPU1, CPU2, CPU3, CPU20, CPU21, CPU22, CPU23 as a single component. Caches 205, 206, 207, 208, 225, 226, 227, 228 may comprise one or more types of common cache memory components, including but not limited to SRAM, synchronous DRAM (SDRAM), flash memory, embedded DRAM (eDRAM), non-volatile RAM (NVRAM), among other types of cache memory components. Each respective cache 205, 206, 207, 208, 225, 226, 227, 228 is dedicated to each processor CPU0, CPU1, CPU2, CPU3, CPU20, CPU21, CPU22, CPU23, holding copies of data block values from the shared main memory to increase processing speed by reducing the need to retrieve data from slower shared main memory within the system.

As discussed above, a CPU cache (not shown in FIG. 2) is configured to hold data blocks pulled from the local memory of the node (i.e., from memories 201, 202, 203, 204, 221, 222, 223, 224) or remote memory (i.e., memories associated with remote nodes). Caches 205, 206, 207, 208, 225, 226, 227, 228 may be configured to store copies of data blocks retrieved from addresses in remote memory, from a different node. In some embodiments, CPU caches and caches 205, 206, 207, 208 may be combined into a single component, and CPU caches and caches 225, 226, 227, 228 may be combined into a single component.

Nodes 200 and 220 each include two node controllers, node controller 1 and node controller 2, and node controller 3 and node controller 4, respectively. As discussed above, node controller 1 and node controller 2 of node 200 and node controller 3, and node controller 4 of node 220 are tasked with managing the access of respective processors CPU0, CPU1, CPU2, CPU3, CPU20, CPU21, CPU22, CPU23 to remote memory and from remote processors to local memory. In various embodiments, there may be few or more node controllers per node. Each node controller serves as a system interconnect, providing each processor CPU0, CPU1, CPU2, CPU3, CPU20, CPU21, CPU22, CPU23, access to memory addresses within the shared memory, including the addresses present in memory components of other nodes in the system. In various embodiments, node controllers 1 and 2 and node controllers 3 and 4 may be implemented as a separate processor component, while in other embodiments node controllers 1 and 2 and node controllers 3 and 4 may be implemented as one or more specialized logic components, including but not limited to state machines configured to perform particular state operations. Each node controller 1, 2, 3, and 4 may comprise a plurality of fabric connectors (not shown in FIG. 2) to interconnect node controllers 1 and 2 with the other nodes, e.g., nodes 3 and 4, within the system such as in the illustrated example in FIG. 1.

In various embodiments, each node controller 1, 2, 3, 4 may comprise logic 212, 214, 216, 218. Each node controller 1, 2, 3, 4, may control a subset of processors CPU0, CPU1, CPU2, CPU3, CPU20, CPU21, CPU22, CPU23. In the illustrated example, node controller 1 is communicatively coupled to processors CPU0 and CPU1, node controller 2 is communicatively coupled to processors CPU2 and CPU3, node controller 3 is communicatively coupled to processors CPU20 and CPU21, and node controller 4 is communicatively coupled to processors CPU22 and CPU23. Moreover, each node controller 1, 2, 3, 4 may proxy for all the processors on remote nodes. Node controllers 1 and 2 appear as a single remote processor to each of processors CPU0, CPU1, CPU2, CPU3, while node controller 3 an 4 appear as a single remote processor to each of processors CPU20, CPU21, CPU22, CPU23. This allows the processor to maintain a more compact coherency directory and device addressing. As a non-limiting example, a processor's coherency directory may only track the state of ownership information of 4 to 8 other processors or devices.

As illustrated in FIG. 2, node controllers 1 and 2 each include one or more ternary content addressable memories (TCAMs) 210a, 210b, 210c, 210d, and node controllers 3 and 4 each include one or more TCAM) 230a, 230b, 230c, 230d. A TCAM is a specialized type of high-speed memory that searches its entire contents in a single clock cycle, similar to the common content-addressable memory (CAM). While CAM provides a binary search pattern (either 0 or 1) for each bit searched, TCAM allows storage and querying of data using at least three data search conditions: 0, 1, and X. The X is referred to as a "don't care" or "wildcard" state, which indicates one or more bits which do not need to exactly match during the search to indicate a match (also referred to as a hit). Use of three search conditions enables TCAM to perform broader searches based on pattern matching, rather than the exact-match binary search of traditional CAM. TCAM can operate on entries representing various sized memory blocks, allowing dynamic sizing of address tags to search. These dynamic sized tags are linked to dynamic sizing remote or local memory data blocks. TCAM allows a single entry to cover a range either wider or smaller than the size of the relevant cache line, reducing the need for individual, specific entries for each address of concern necessary for a CAM. It should be noted, however, that various embodiments are not necessarily limited to TCAMs, and can be applied/implemented in CAMs. Those of ordinary skill in the art would understand that if applying to CAMs (rather than TCAMs), tag size will be the same, as opposed to TCAMs where tag size can vary depending on how large a block of memory is being tracked by the coherency directory cache.

Each TCAM 210a, 210b, 210c, 210d may be configured to track ownership of any data blocks accessible by one of processors CPU0, CPU1, CPU2, CPU3 or any other processor socket in the system. Each TCAM 230a, 230b, 230c, 230d may be configured to track ownership of any data blocks accessible by one of processors CPU20, CPU21, CPU22, CPU23 or any other processor socket in the system. As discussed above, there are various cache coherency protocols that can be implemented in SMPs to address the coherency issue. Generally, these cache coherency protocols utilize state tags to ensure that coherency is maintained, with common states including modified (M), exclusive (E), shared (S), and invalid (I). Modified indicates that the cache line is "dirty," meaning the value has been modified and is different from the value in the shared memory. Exclusive indicates that the value of a cache line is the same as the value in the shared memory, and that this cache maintains the only cached copy of that data block. Shared indicates that the value is the same as the value in a memory data block of the shared memory, but there are more than one copy of the main memory data block in other caches within the system. Invalid indicates the cache line data is not valid and may be reused. Every cache line starts off in the invalid state, indicating no ownership of the respective data block.

To illustrate an example of cache coherency protocol operation, CPU0 may read address X in memory 202. That is, CPU0 sends a read message to CPU1. CPU1 ensures the data for address X is not held by any processor, e.g., any of CPU0, CPU1, CPU2, or CPU3. To ensure the data is not held by any processor, CPU1 sends a snoop request message to node controller 1. It should be noted that a snoop request is not sent to CPU0 since CPU0 is the processor that sent the read request. Node controller 1 may have a miss in its coherency directory cache (i.e., not found in a TCAM (described in greater detail below). Node controller 1 fetches the coherency directory state from CPU1's memory, and node controller 1 responds to the snoop request with an "unowned" message. Node controller 1 saves a coherency directory state to the coherency directory cache. Because CPU1 now is aware that no other processor has the requested data, it can read address X for memory 202, and send the data to CPU0.

Next, CPU2 may read address X in memory 202, where CPU2 sends a read message to node controller 2, and node controller 2 forwards a read message to node controller 1. Node controller 1 has a hit in its TCAM (as it was saved, described above), and coherency directory cache indicates the data is "unowned. Thus, node controller 1 forwards the read to CPU1. CPU1 ensures the data for address X is not held by any processor. To do this, CPU1 sends a snoop message to CPU0 (similar to the above, CPU1 does not send a snoop message to node controller 2 since that is where the read came from. CPU0 sends a message back to CPU1 indicating it has surrendered ownership of the data, and CPU1 sends the data to node controller 1. Node controller 1 forwards the data to node controller 2, and node controller 1 updates the coherency directory cache state to indicate that CPU2 owns the data for address X. Node controller 2 can then forward the data message to CPU2.

Figure 3A:
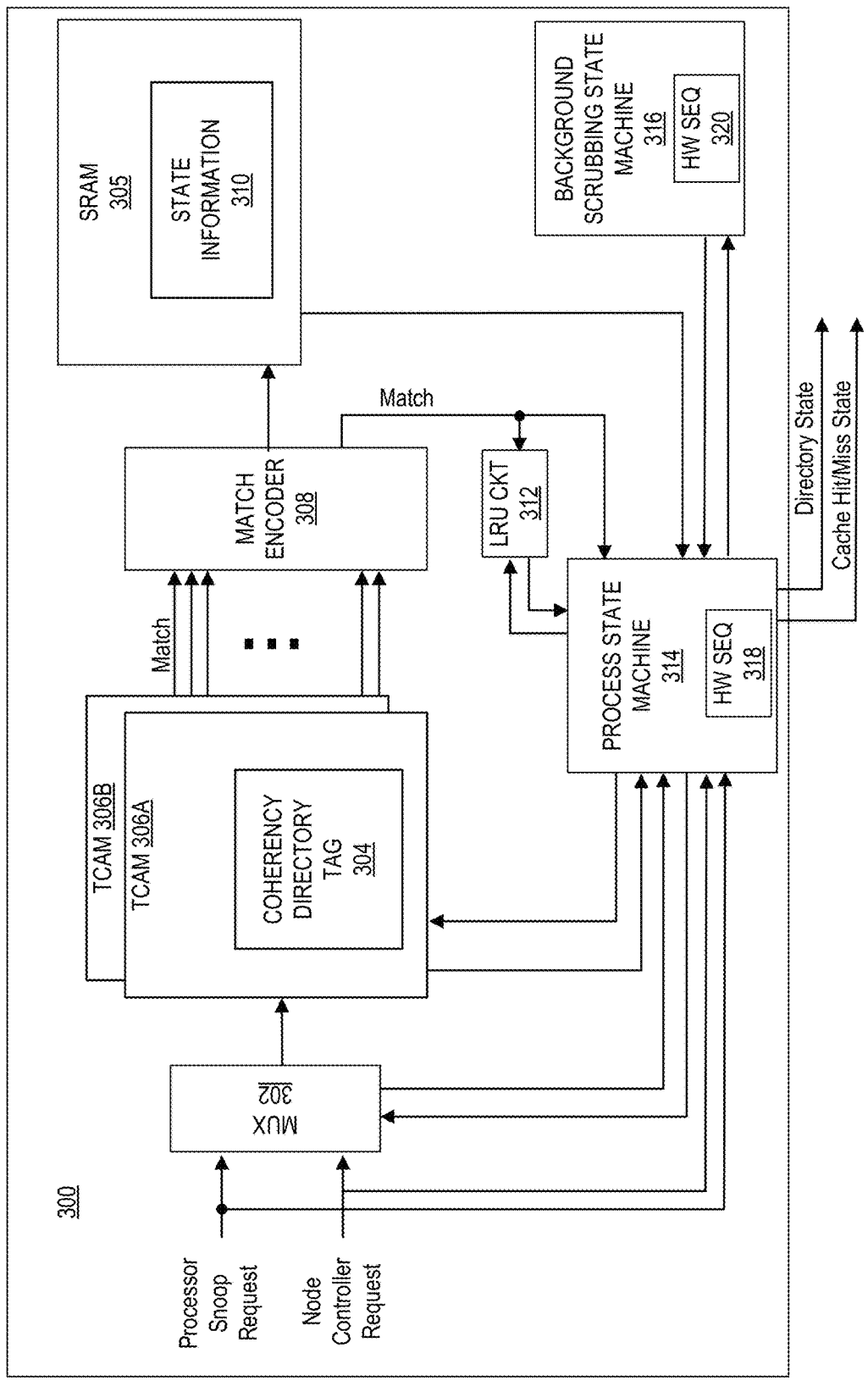
FIG. 3A is a schematic representation of an example layout of a coherency protocol implementation apparatus in accordance with one embodiment of the technology disclosed herein.

Referring to FIG. 3A, an example coherency directory cache management apparatus or circuitry 300 may be implemented at a node controller, e.g., node controllers 1, 2, 3, 4 (FIG. 2), and may include a multiplexer 302 to receive requests such as a processor snoop request (referenced in the above-described cache coherency example) or a node controller request. A processor snoop request may be described as an operation initiated by a local processor to inquire about the state and ownership of a memory block or cache line. A node controller request may be described as an operation initiated by a remote processor or remote node controller that was sent to a local node controller including apparatus 300. In some embodiments, a request may be some memory operation request comprising a read operation and/or a write operation. Coherence protocol may dictate what permissions are to be obtained when accessing a particular memory block or cache line in a memory (e.g., one or more of memory 201, 202, 203, 204, 221, 222, 223, 224), such as when writing or reading to the at least one memory block stored in memory. As will be appreciated, different systems may follow different coherence protocols. As will be described above, certain logic, circuits, and/or state machines carryout the coherence protocol based on data in a coherency directory.

The requests may be directed to a coherency directory tag 304 to determine whether state information is present with respect to a particular memory block (i.e., cache line). The coherency directory tag 304 may include information related to a plurality of memory blocks. That is, and referring to FIG. 3B, the coherency directory tag 304 may include a collection of upper addresses that correspond to the system memory blocks or cache lines where the state and ownership information is being cached in the coherency directory cache (e.g., maintained in TCAMS 306A and 306B). For example, the upper addresses may include upper address-A, upper address-B, . . . , upper address-N, etc. Each upper address may have a corresponding row number (e.g., row number 1, 2, . . . , N) associated with each entry. Each upper address may be 0-N don't care bits depending on the location. As disclosed herein, the size of these memory blocks may be defined for ease of implementation to be the same as system cache lines for a computer system (or for different computer systems). These cache line sized memory blocks for discussion clarity may be referred to as cache lines.

Ownership may be described as an identification as to what node or processor has ownership of the tracked system memory block or cache line. In a shared state, ownership may include the nodes or processors that are sharing the system memory block or cache line.

The requests may be processed by one or more TCAMs 306A and 306B (each of which may be embodiments of one of TCAMs 210a-210d or 230a-230d). For the TCAM 306A, each cache entry may include a TCAM entry to hold an upper address for comparison purposes with the requests. This upper address may be referred to as a tag. With respect to the upper address, a processor system may include a byte or word address that allows for the definition of the bits of data being accessed. When multiple bytes or words are grouped together into larger blocks, such as cache lines, the upper address bits may be used to uniquely locate each block or cache line of system memory, and lower address bits may be used to uniquely locate each byte or word within the system memory block or cache line.

A tag may be described as a linked descriptor used to identify the upper address. A directory tag may be described as a linked descriptor used in a directory portion of a cache memory. The coherency directory tag 304 may include all of the tags for the coherency directory cache, and may be described as a linked descriptor used in a directory portion of a coherency directory cache memory. The coherency directory tag 304 may include the upper address bits that define the block of system memory being tracked.

The directory tags may represent the portion of the coherency directory cache address that uniquely identifies the directory entries. The directory tags may be used to detect the presence of a directory cache line within the coherency directory tag 304, and, if so, the matching entry may identify where in the directory state storage the cached information is located. One coherency directory cache entry may represent the coherency state and ownership of one or more system cache lines of memory.

At the match encoder 308, a request processed by the TCAM 306A may be processed to ascertain a binary representation of the associated row (e.g., address) of the coherency directory tag 304. For the TCAM 306A, each row or entry of the TCAM 306A may include a match line that is activated when that entry matches the input search value. For example, if the TCAM 306A has 1024 entries, it will output 1024 match lines. These 1024 match lines may be encoded into a binary value that may be used, for example, for addressing the memory that is storing the state and ownership information. For example, if match line 255 is active, the encoded output from match encoder 308 would be 0xFF (as the encoder output field is 10 bits wide).

Referring also to FIG. 3C, a state information 310 block may include the current representation of the state and ownership of the memory block (i.e., cache line) for the request processed by the TCAM 306A. For example, the state information 310 may include a "valids" column that includes a set of valid bits (e.g., 1111, 0000, 0011, 0010), a "state info." column that includes information such as shared, invalid, or exclusive, and a "sharing vector/ownership" column that includes sharing information for a shared state, and ownership for the exclusive state. According to an example, the rows of the state information 310 may correspond to the rows of the coherency directory tag 304. Alternatively, a single row of the coherency directory tag 304 may correspond to multiple rows of the state information 310. With respect to coherency directory tag 304 and the state information 310, assuming that upper address-A covers four cache lines that are all valid, these four cache lines may include the same state information and sharing vector/ownership. The length of the valid bits may correspond to a number of decodes of the don't care bits. The coherency directory cache output information related to the memory block state and ownership information may also include a directory cache hit indicator status (e.g., a coherency directory tag 304 hit) or a directory cache miss indicator status responsive to the requests received by the multiplexer 302. The ownership may include an indication of a node (or nodes) of a computer system or different computer systems that are sharing the memory block. In this regard, the actual information stored may be dependent on the implementation and the coherency protocol that is used. For example, if the protocol being used includes a shared state, the ownership information may include a list of nodes or processors sharing a block. The state and ownership may be retrieved from the state information 310 memory storage based on the associated matching row from the TCAM 306 as encoded into a memory address by match encoder 308.

The directory hit or a directory miss information may be used for a coherency directory cache entry replacement policy. For example, the replacement policy may use least recently used (LRU) tracking circuit 312. The least recently used tracking circuit 312 may evict a least recently used cache entry if the associated cache is full and a new entry is to be added. In this regard, if an entry is evicted, the TCAM 306A may be updated accordingly. When the TCAM 306A is full, the complete coherency directory cache may be considered full. The LRU tracking circuit 312 may receive hit/miss information directly from the match encoder 308. However, the hit/miss information may also be received from the process state machine 314. When a cache hit is detected, the LRU tracking circuit 312 may update an associated list to move the matching entry to the most recently used position on the list.

Tag data associated with an entry in the TCAM 306A may include the possible memory states of "0", "1", or "X", where the "X" memory state may represent "0" or "1", and may be designated as a "don't care" memory state. The least significant digit in the TCAM 306A of a cache line address may define the address of the cache line within a group of cache lines. The least significant digits may be represented by the "X" memory state. Thus, one coherency directory cache entry may represent the state of several (e.g., 2, 4, 8, 16, etc.) system cache lines of memory. These memory blocks or system cache lines may be grouped by powers of 2, as well as non-powers of 2. For non-powers of 2, a comparison may be made on the address with respect to a range. For example, if the address is between A and C, then the memory blocks or system cache lines may be grouped. Thus, each TCAM entry may represent any number of system cache lines of memory. These multiple cache lines may be grouped based on a determination that the multiple cache lines are adjacent, and further based on a determination that the multiple cache lines include (or are likely to include) the same state and ownership to share a TCAM entry. In this regard, the adjacent cache lines may include cache lines that are within the bounds of a defined group. Thus, adjacent cache lines may include cache lines that are nearby, in close proximity, or meet a group addressing specification.

A process state machine 314 may analyze, based on the requests such as the processor snoop request and/or the node controller request, state and ownership information for associated cache lines to identify cache lines that may be consolidated with respect to the TCAM 306A.

A background scrubbing state machine 316 may also analyze state and ownership information associated with adjacent cache lines to identify cache lines that may be consolidated with respect to the TCAM 306A. Thus, with respect to consolidation of cache lines, the process state machine 314 may perform the consolidation function when adding a new entry, and the background scrubbing state machine 316 may perform the consolidation function as a background operation when the coherency directory cache is not busy processing other requests. With respect to the background operation performed by the background scrubbing state machine 316, the state and ownership information may change over time. When information with respect to a given block was originally written and could not be grouped because the state or ownership information did not match the information of other blocks that would be in the combined group, this information for the given block may correspond to a separate coherency directory cache entry. If, at a later time, some of the information related to state or ownership changes, the grouping may now possibly occur. Thus, the background scrubbing state machine 316 may operate when the requests such as the processor snoop request and/or the node controller request are not being processed. In this regard, the background scrubbing state machine 316 may find matching entries and rewrite the TCAM entries to perform the grouping of memory blocks to be represented by a single entry as disclosed herein.

The hardware sequencer 318 and the hardware sequencer 320 may include hardware (or processor implemented instructions) to utilize, for the coherency directory tag 304, an entry in a memory structure to identify the information (e.g., the address bits) related to the grouped cache lines. In this regard, data associated with the "don't care" entry in the memory structure may include greater than two possible memory states. According to examples, the entry may include an address that uniquely identifies the entry in the memory structure. For instance, the entry may include an address without any "don't care" bits." According to examples, the entry may include a single entry in the memory structure to identify the information related to the grouped cache lines. For instance, the entry may include an address with one or more of the least significant digits as "don't care" bits. According to examples, a number of the grouped cache lines may be equal to four adjacent cache lines. For instance, the entry may include an address with the two least significant digits as "don't care" bits.

For the TCAM 306A, the hardware sequencer 318 and the hardware sequencer 320 may further include hardware (or processor implemented instructions) to write a specified number of lower bits of the address as "X" bits. In this regard, the data associated with the entry in the TCAM 306A may include the possible memory states of "0", "1", or "X", where the "X" memory state (e.g., the "don't care" memory state) may represent "0" or "1". For example, the lower two bits of the upper address (tag) may be programmed within the TCAM as "don't care" when an entry is written into the coherency directory tag 304. This example illustrates the configuration when a single coherency cache entry covers a group of up to four system cache lines.

State information may include a 4-bit valid field. The implementation with the 4-bit valid field may represent an implementation where the two least significant upper address bits may be allowed to be "don't care." In this regard, with respect to other implementations, a number of bits in the validity field would change. For example, for an implementation with up to 3 "don't care" bits, the valid field would be 8 bits long, because there are $2^3=8$ (or generally, $2^n$, where n represents the number of "don't care" bits) unique decodes of the three lower address bits. With respect to the state information that includes a 4-bit valid field, each of these 4 bits may correspond to a decode of the lower two bits of the upper address allowing an association of each bit with one of the four cache lines within the four cache line group. These 4 bits may be considered as valid bits for each of the four system memory cache lines. Each TCAM entry may now represent the state and ownership information for anywhere from zero, not a valid entry, to four cache lines of system memory. The coherency directory cache tracking may be described as the coherency directory cache monitoring the status of whether the bit is active or inactive.

A search of the TCAM 306A may be performed to determine whether a new entry is to be added. The search of the TCAM 306A may be performed using the upper address bits of the cache line corresponding to the received request. If there is a TCAM miss then the tag may be written into an unused entry. If all cache entries are used, then a least recently used entry may be evicted and the new tag may be written into that TCAM entry.

If during the TCAM search there is a match between the new upper address bits and a tag entry within the TCAM, the 4-bit field discussed above may be examined. If the corresponding bit in the 4-bit field, as selected by a decode of the lower two bits of the upper address, is set, then a cache hit may be indicated and processing may continue. If the corresponding bit in the 4-bit field discussed above is not set, then a comparison may be made of the state and ownership information. If the state and ownership information is the same for the new system memory cache line and the cached value of the state and ownership information, then the corresponding bit in the 4-bit field may be set to add this new system memory cache line to the coherency directory tag 304. The state and ownership field may apply to all cache lines matching the address field and that have a corresponding valid bit in the 4-bit validity field. Thus, if the state and ownership of the cache line being evaluated match the state and ownership field, then the corresponding bit of the validity field may be set. With respect to the state and ownership information, based on a determination that the specified bit is not set, the hardware sequencer 318 may further include hardware (or processor implemented instructions) to determine whether a state and an ownership associated with the new entry are respectively identical to the state and the ownership associated with the previous entry. Further, based on a determination that the state and the ownership associated with the new entry are respectively identical to the state and the ownership associated with the previous entry, the hardware sequencer 318 may further include hardware (or processor implemented instructions) to set the specified bit to add the new entry to the apparatus 300. In this regard, setting the specified bit may refer to the valid bit associated with the specific system memory block or cache line.

If the corresponding bit in the 4-bit field discussed above is not set, then a comparison may be made of the state and ownership information. If the state and ownership information as read from the state information 310 are not the same as the state and ownership information associated with the new tag, then this new tag may be added to the TCAM 306A.

According to an example, assuming that the coherency directory tag 304 includes an entry for 10X, a validity field 0011, and a state/ownership SO, and a snoop request is received for cache line address 310, which has state/ownership SO, then the entry for 10X may be updated to address 1XX, the validity field may be set to 0111, and SO may be returned in response to the snoop.

Part of the information in the processor snoop request and the node controller request may be used to determine how the select on the multiplexer 302 is to be driven. If there is a processor snoop request and no node controller request, the process state machine 314 may drive the select line to the multiplexer 302 to select the processor snoop request.

The process state machine 314 may control the multiplexer 302 in the example implementation of FIG. 3A. The process state machine 314 may receive part of the amplifying information related to a different request that is selected.

With respect to information sent from the match encoder 308 to the process state machine 314 and LRU tracking circuit 312, the process state machine 314 and LRU tracking circuit 312 may receive both the match/not match indicator and the TCAM row address of the matching entry from the match encoder 308.

The directory state output shown in FIG. 1 may include the state and the ownership information for a matching request. The directory state output may be sent to other circuits within the node controller or processor application-specific integrated circuit (ASIC) where the apparatus 300 is located. The other circuits may include the circuit that sent the initial request to the coherency directory cache.

The cache hit/miss state output shown in FIG. 3A may represent an indication as to whether the request matched an entry within the coherency directory cache or not. The cache hit/miss state output may be sent to other circuits within the node controller or processor ASIC where the apparatus 300 is located. The other circuits may include the circuit that sent the initial request to the coherency directory cache.

As alluded to above, the interconnect between a node control and processor socket, e.g., between node controller 3 and CPU20 may have a higher bandwidth than between node controllers, e.g., between node controller 3 and node control 4. Thus, messaging, e.g., requests, between remotely located node controllers can take longer to process than when accessing data stored in local memory. That is, if data to be read, for example, is stored in memory 221 vis-a-vis CPU20, node controller 3 can access that data more quickly than if node controller 3 had to access that data if the data were stored in memory 205 vis-à-vis CPU2.

In order to reconcile such bandwidth disparities, a node controller interconnect would have to be increased to more lanes or higher baud rates. However, in terms of increasing baud rate, there are limits and higher baud rates typically require more die area and power. Moreover, adding lanes increases system cost and negatively impacts die size as significantly more SERDES would be needed for the node controller interconnect. In package interconnects, while potentially a solution would also increase system cost. Moreover, processor interconnects are being targeted to accommodate higher and higher bandwidths.

Accordingly, various embodiments leverage bidirectional node controller interconnect links that are characterized by more bandwidth consumption associated with memory operation request messages versus cache line data messages. As noted above, various embodiments group requests of related, potential requests with a first, e.g., original or actual, request to create a block request grouping or block request. This block request can be sent as a single message to a remote node from a local node, thereby improving average memory request latency and node controller bandwidth. In particular, average remote latency is improved because a remote node can begin processing subsequent requests before they have even been requested. Bandwidth is improved because there is a reduced number of requests sent on the node controller interconnect.

Figure 4A:
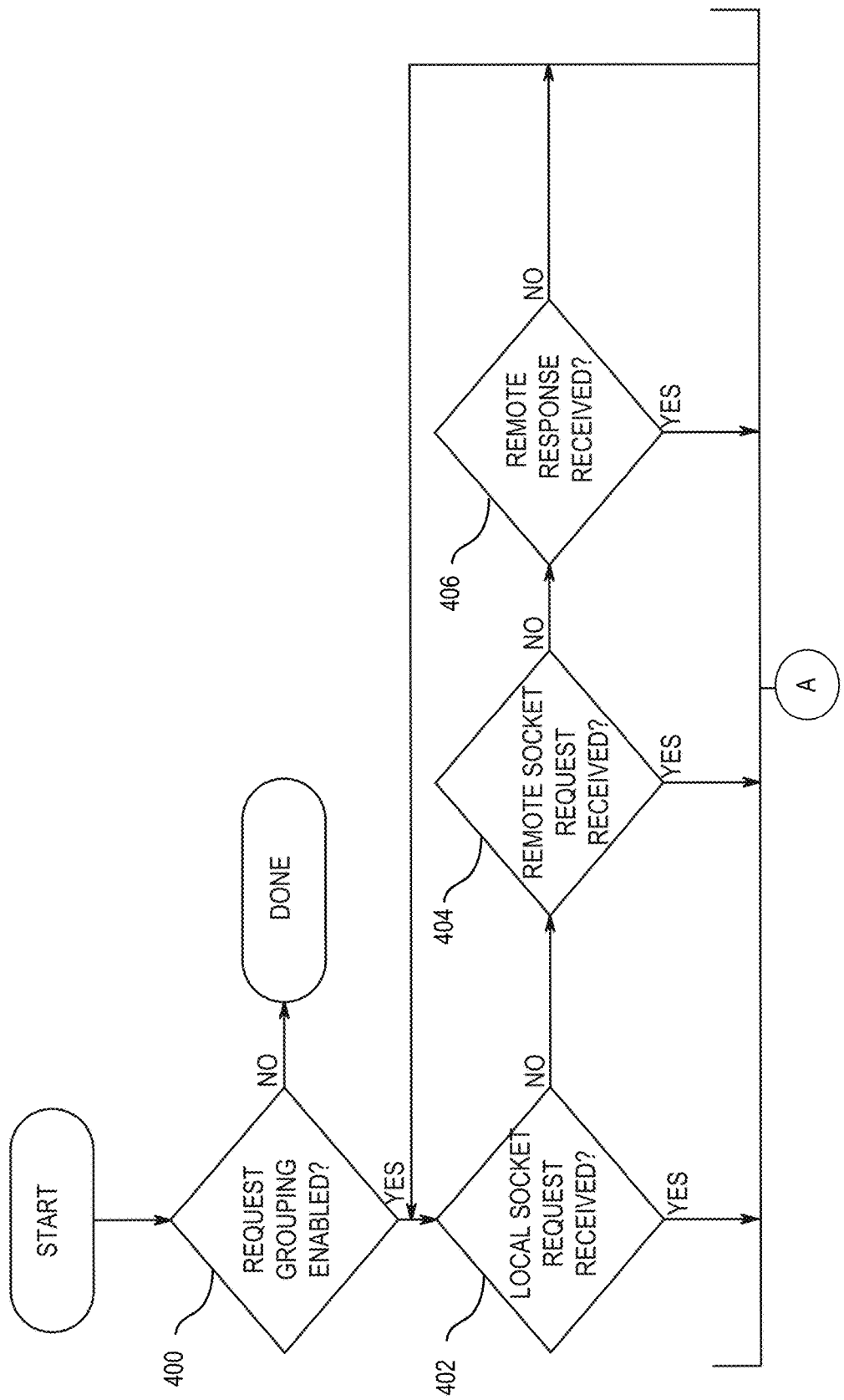
FIG. 4A shows a first part of an example coherency protocol processing flow in accordance with one embodiment of the technology disclosed herein.
Figure 4B:
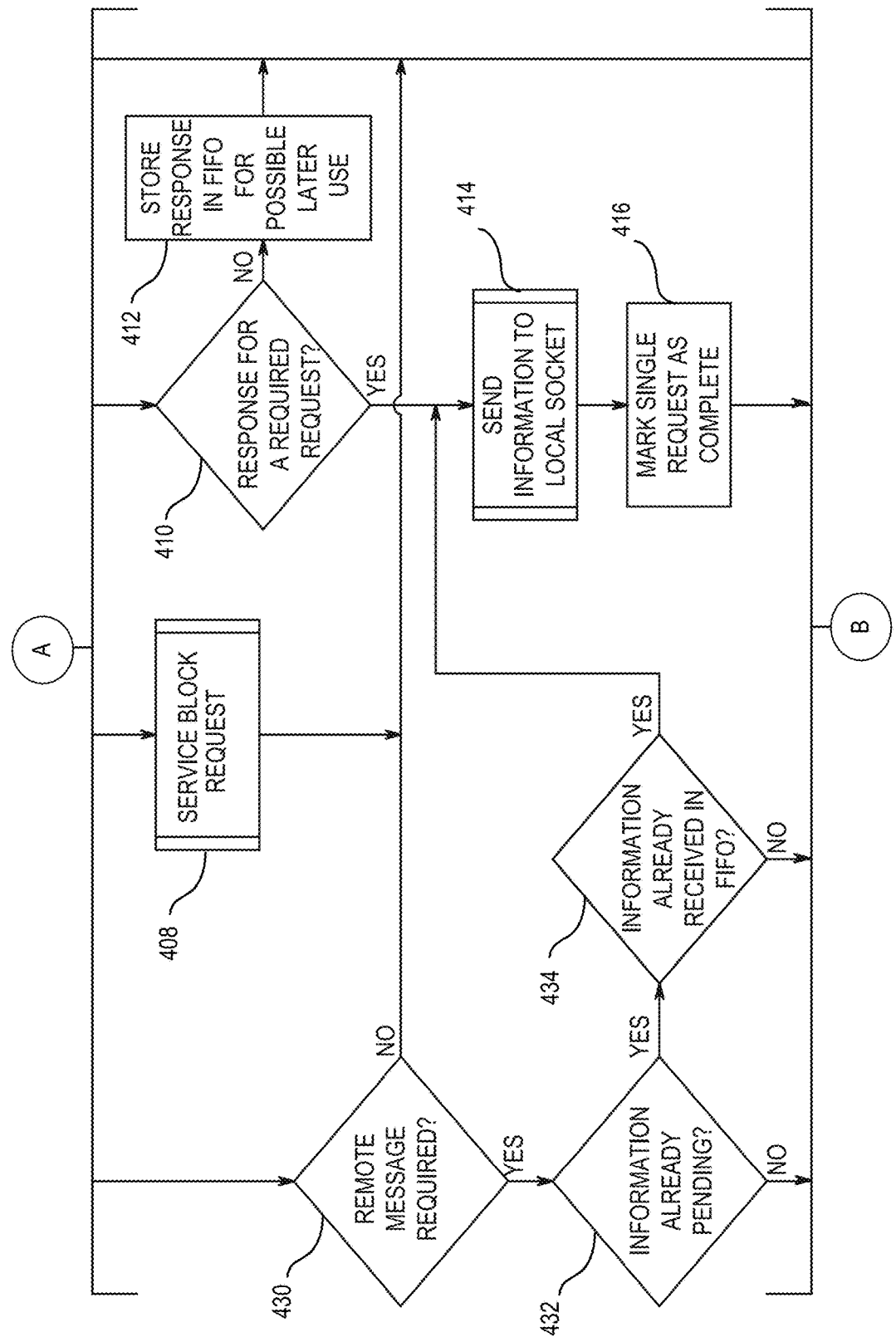
FIG. 4B shows a second part of the example coherency protocol processing flow of FIG. 4A.
Figure 4C:
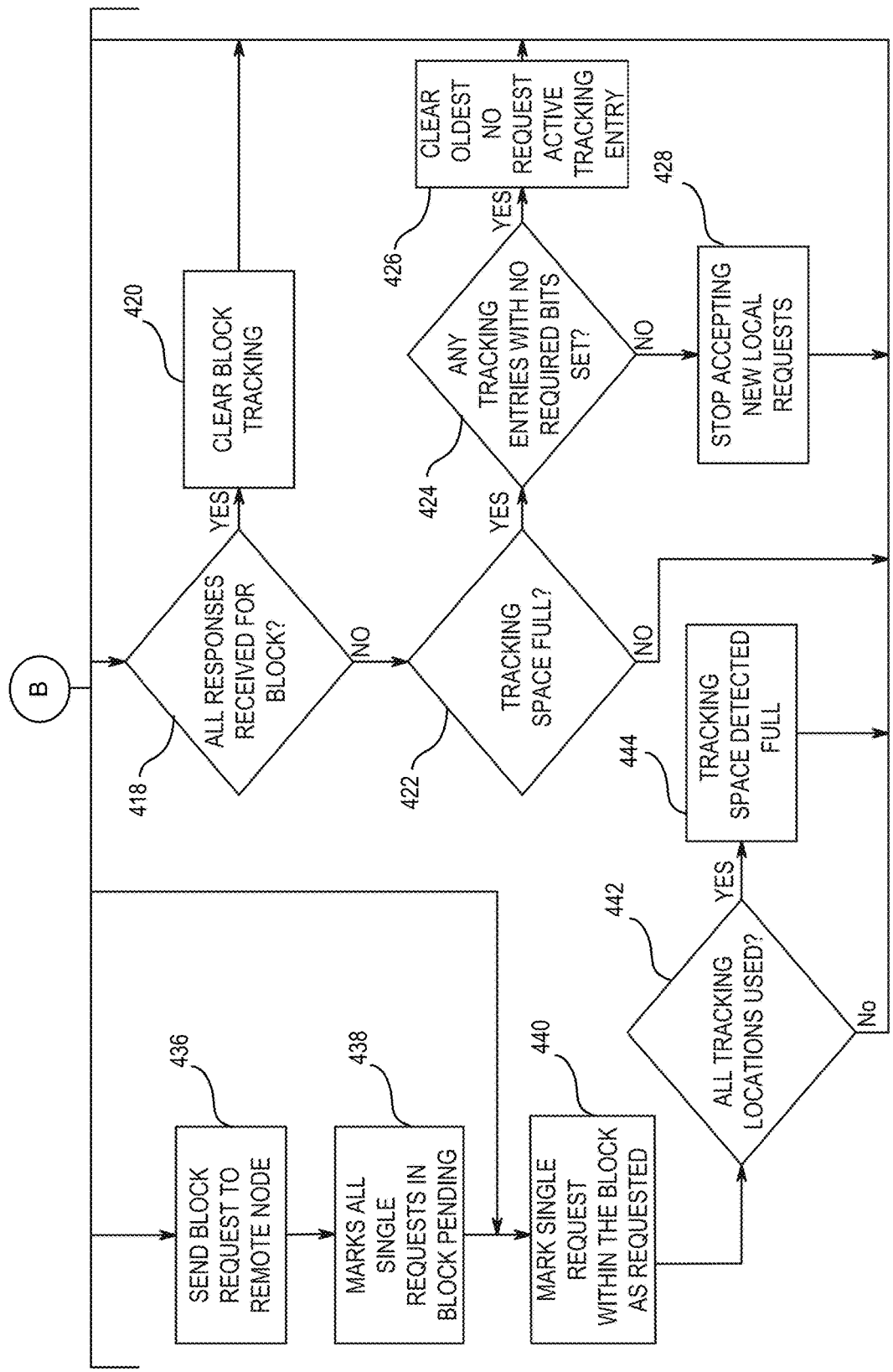
FIG. 4C shows a third part of the example coherency protocol processing flow of FIG. 4A.

FIGS. 4A-4C illustrate a method of coherent protocol processing in accordance with one embodiment using block request grouping. In some embodiments a check is performed at operation 400 to determine if block request grouping has been enabled in the system. If block request grouping is not enabled, the method ends. It should be noted that block request grouping may be implemented at a node controller or processor socket level, and effectuating such grouping can be accomplished in a processor socket or a node controller, and can be activated by a register setting.

If block request grouping is enabled, at operation 402, a determination is made regarding whether or not a memory operation request has been received from a local processor socket. For example, and referring back to FIG. 2, a memory operation request, such as a read operation request may have been received at node controller 3 of node/socket group 220 from a processor socket, e.g., CPU2. Logic 216 of node controller 3 may determine whether or not the read operation request has been received from/was transmitted by a local processor socket, e.g., one of CPU20, CPU21, CPU22, CPU23. It should be understood that the terms local and remote can reflect location/implementation relative to the node controller currently executing the coherent protocol processing/block request grouping. That is, a local request is can refer to a request received from a socket directly connected to the node controller. A remote request or response can refer to a message from a socket that is not connected directly to this specific node controller. It should be further understood that each socket can be both local and remote based on the perspective of which node controller is performing block request grouping.

If a memory operation request has been received from a local processor socket, processing proceeds to operation 430. If not, a determination is made regarding whether or not a memory operation request has been received from a remote socket at operation 404.

If a memory operation request has not been received from a remote socket, a determination is made at operation 406, e.g., by logic 216 of node controller 3, regarding whether or not a response to the remote socket request was received If not, processing can return to operation 402. If node controller 3 has received a remote processor socket request, node controller 3 can service or process the request at operation 408. For example, the read operation request may be processed by accessing the data from the appropriate memory, and returning the data to the requesting remote processor socket. For example, a read operation request may have come from CPU3 requesting data stored in memory 221. Processing may then again return to operation 402.

If logic 216 of node controller 3 determines that what was received was a remote processor socket response to a request (at operation 406), a check may be performed at operation 410 to determine if the response is for a required request, i.e., if the response pertains to/includes data responsive to an actual (rather than a speculative/proactive request). If not, at operation 412, the response can be stored in FIFO for possible later use. Because multiple requests can be grouped together in a block group request, where two or more of the multiple requests are proactive or speculative requests, rather than actual requests, responses to those proactive/speculative requests can be held in FIFO until an actual request for the retrieved information is actually received. If that actual request does not come after some time or after tracking space is full (described in greater detail below), that information can be cleared.

If the response is a response to a required request, at operation 414, the information/data that was requested is sent to the local processing socket that made the request. For example, if CPU23 requested information that was owned by CPU0 and stored in memory 201, and the response received was this requested information, the information can be sent to CPU23. It should be noted, that this is a simplified exemplary illustration and checks for response ordering, conflicts and other issues may delay when the response information is actually sent to the local socket.

At operation 416, the request may be marked as being complete. That is, a node controller, such as node controller 3 can track memory operation requests using tracking entries by both local and remote processor sockets. Moreover, outstanding requests can be tracked, e.g., block group requests covering a particular number of consecutive or adjacent memory blocks/cache lines. The coherency directory cache of the node controller, e.g., that maintained by TCAMs 210A, 210B, can be updated with ownership, state, and other information indicative of the memory operation requests. In one embodiment, such a marking comprises clearing a tracking bit for tracking an outstanding request. For example, all non-speculative requests from a local processor socket can be tracked, and responses associated with non-speculative requests received from a local processor socket are to be delivered to the requesting local processor socket, and cannot be discarded. The tracking information, e.g., tracking bit, can be maintained in a scoreboard-like structure in some embodiments, and the response itself may be also stored in a memory temporarily to ensure delivery order when required, and transmission link availability as the link to a local processor socket may currently be busy or in some cases blocked. It should be noted that as alluded to above, and as will be described in greater detail below, responses/information can be received pursuant to a single message containing a block group request of multiple related requests due to likely common state/ownership characteristics. Because responses/information can be received without a request having been submitted yet, when a response to an actual request has been received, that "single" request (or the "single" request portion of the aforementioned block group request) can be marked as being complete.

At operation 418, a determination is made as to whether or not all responses for a block group request have been received. Again, as noted above, multiple requests can be grouped together in a block group request and sent as a single message to a remote processor socket. As part of receiving a response, this check can be performed to determine whether or not responses to all of the multiple requests of the block group request have been received or if responses are still outstanding for one or more of the multiple requests. If a response for each of the multiple requests have been received, at operation 420, tracking for the block group request can be cleared.

If a determination is made at operation 418 that all the responses for a block group request have not yet been received, a check can be performed at operation 422 to determine whether or not the tracking space, e.g., the tracking space in memory for tracking requests to remote sockets, is full. If the tracking space is not yet full, processing can return to operation 402, and subsequent responses can be handled as set forth above. If the tracking space, on the other hand, is determined to be full, at operation 424, a determination can be made regarding whether or not any tracking entries with no required bits are set. If the required tracking bit is set, that entry cannot be cleared from the tracking space. That is, tracking entries (as noted above) can include a bit indicating whether or not information has been requested and is waiting to be delivered. If information is waiting to be delivered, the tracking entry for that information will include/be associated with a required bit, i.e., the information is no longer speculative, e.g., a subsequent request for that information has been received. If, on the other hand, the information is still speculative at this point when tracking space is full, it can be cleared. Accordingly, because the tracking space is full (as determined in operation 422), and because no tracking entries are available to be cleared from the tracking space (as determined in operation 424), no new tracking entries regarding local requests are accepted at operation 428. Thereafter, processing can return to operation 402. If one or more of the tracking entries is not required (i.e., does not have its required bit set), the oldest active tracking entry that has not been associated or linked to an actual request can be cleared from the tracking space at operation 426. It is implied that once tracking space becomes available the accepting of new local requests can resume. Again, processing can return to operation 402.

It should be understood that the aforementioned speculation can be space-driven, i.e., whether or not the tracking space is full or not (described above). Speculation can also be state-driven. For example, speculative information/data that is in a shared state may, depending on the application, circumstances, etc., be held rather than discarded, as opposed to information/data that is in an exclusive state, or vice versa. In some embodiments speculation can also be based on past history regarding which data state's speculative data was used most often to determine whether or not it can be discarded. In still other embodiments, speculation can be time-driven. That is, whether or not a tracking entry is kept or cleared can depend on the amount of time information has remained un-requested. That is, a tracking entry threshold can be specified indicating a maximum (and/or minimum) amount of time that the tracking entry can exist in the tracking space. In some embodiments, a combination of metrics or factors may be considered. As just one example (other metrics/factors and/or combinations thereof may be used) time may be used as a basis for a discard policy, but only until a space threshold is reached, at which point, a different discard/retention policy/policies may be applied. It should be understood that the coherency protocol(s) that the system follows can impact how tracking is performed.

It should also be understood that the amount of speculative information/requests for information can vary. For example, in one embodiment, a particular number of adjacent or consecutive cache lines are considered likely to have the same state/ownership characteristics, and a commensurate number of requests can be grouped in a block group request. For example, the state and ownership information regarding stored data can be used to affect the amount of data that would be speculatively requested. Consider a programmable maximum limit is configured regarding the number of speculative cache lines, and that limit is programmed to, e.g., eight speculative cache lines. Upon examining the coherency directory information, if a change in state/ownership is detected, the speculative data that can be requested (in a block group request) may be limited to consecutive cache lines that match both the state and ownership of the required (actually requested) cache line. That is, anywhere from one to eight (actual and/or speculative) cache lines may be requested. If one cache line is requested, that one cache line may correspond to the actually requested cache line, if eight cache lines are requested, one is actually requested, seven consecutive cache lines are speculatively requested, and so on. Again, come embodiments are directed to using state/ownership information to refine when/how much speculative data is to be requested using a block group request. For example, if two consecutive cache lines have different states (one is shared, the other is exclusive), and a memory operation request is made for the shared cache line, the next cache line (in the exclusive state) may not be speculatively requested as it has a different state and will have a lower probability of being used.

Returning to operation 402, if, e.g., logic 216 of node controller 3 determines that the request that was received is a request from a local processor socket, such as a request from one of CPU20, CPU21, CPU22, CPU23, a determination can be made at operation 430 as to whether or not, a remote message is required. As noted above, the number of lanes and bandwidth between a node controller such as node controller 3, and a local processor socket, e.g., CPU20, can be higher than that between the node controller 3 and another node controller, e.g., node controller 2. Thus, block group requests may not necessarily be used when the request is merely a local processor socket request because enough bandwidth between a node controller, in this case, node controller 3 and processor socket, in this case, CPU20 is sufficient. Moreover latency is also sufficient between node control 3 and processor socket CPU20. However, if a message regarding the request, e.g., a message forwarding a request received by node controller 3 to memory 204 controlled by CPU3 which, in turn, is managed by node controller 2, between which latency and bandwidth issues can arise, block group requests can be utilized. Thus, multiple speculative requests for information maintained by memory 204, e.g., adjacent cache lines, as described above, having or likely having the same state/ownership characteristics, can be combined with the actual received request.

At operation 432, a check can be performed to determine if there is information that is already pending. That is, if a request for information has already been transmitted to a remote processor socket, another request need not be sent out. It should be noted that when information or data is pending, some identifying/tracking information is stored. As noted above, such tracking information, e.g., a tracking bit, may be stored or maintained in scoreboard-type memory structure or any memory including, for example, flip/flops. If another processor socket is requesting the same information, processing of this request can be handled per the coherency protocol. For example, the first request for the information may need to be serviced first to maintain coherency before servicing the second request for the same information. Alternatively, each memory owner, e.g., each processor socket, can police requests so any collisions or conflicting requesting nodes/processor sockets actions can be addressed. Thus, the owner of the information can determine how to handle simultaneous or subsequent requests for the same information/access to the same memory block(s)/cache line(s). For example, snoop requests may be processed to validate ownership while information is being held in FIFO. That is, information can be maintained in the FIFO of a processor socket, but the processor socket does not own the information, and ownership should be accurately reflected.

At operation 434, a check can be performed to determine whether or not the information that has been requested is already in the FIFO. As described herein, block group requests aggregate multiple requests for information, where at least one of the multiple requests is a speculative request. Upon receiving information in response to such a speculative request, the information is maintained in a FIFO until it is deemed it should be discarded from the FIFO or until it is no longer a response to a speculative request. That is, a processor socket may have actually requested the information, at which point, the information can be sent to the local processor socket (at operation 414 described above). If the information is not already received and in the FIFO, processing can progress to operation 440 (described in greater detail below).

If, at operation 432, a determination is made that information is not already pending, a block request is generated and sent at operation 436 including multiple requests for the memory block/cache line containing the information requested along with adjacent or consecutive memory blocks/cache lines, e.g., up to the specified number (reflecting what is speculated as being commonly owned and having the same state). As described above, the number of speculative requests can vary based on state, time, and/or other considerations/factors.

At operation 438, each request making up the block group request that has been generated as pending are marked. Upon actually transmitting the request, the requests can be marked as having been requested at operation 440. The marking of the requests, as described above may comprise clearing a tracking bit for tracking an outstanding request.

At operation 442, a check is performed to determine if all the tracking locations are taken up, i.e., the tracking space discussed above is full. If not, processing can return to operation 402. If so, at operation 444, the tracking space is detected as being full, and again, processing can return to operation 402.

Figure 5:
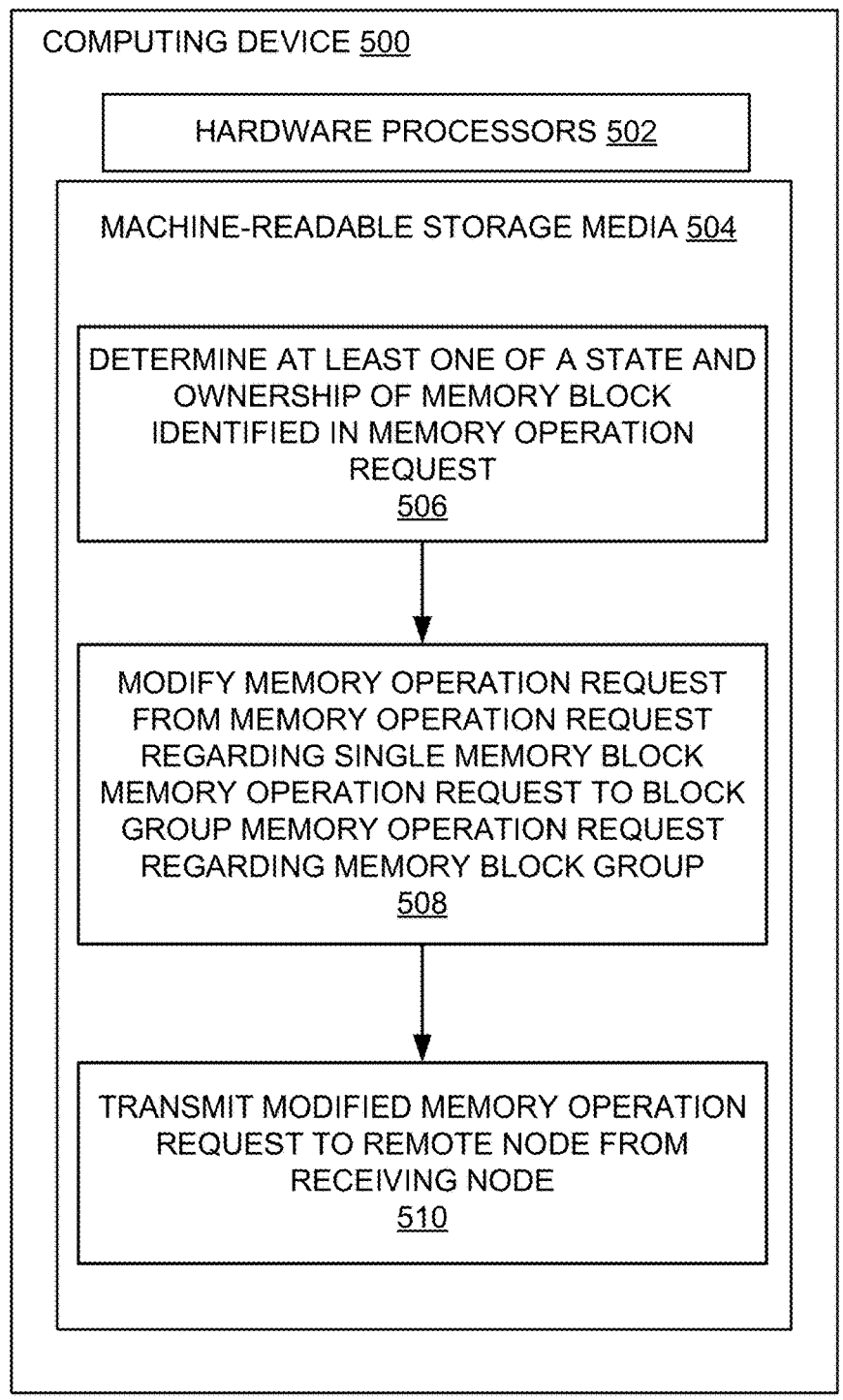
FIG. 5 is an example computing device for performing coherency protocol processing in accordance with one embodiment of the technology disclosed herein.

FIG. 5 is an example computing device 500 in accordance with embodiments of the present disclosure. Where operations and functionality of computing device 500 are the same or similar to those discussed with respect to FIGS. 1-4B, the description should be interpreted to apply. For example, computing device 500 may be an embodiment of node 200 or 220, a node controller, e.g., one of node controllers 1, 2, 3, 4, an apparatus 300, a process state machine 314, etc. Computing device 500 includes one or more hardware processors 502 that may be one or more central processing units (CPUs), semiconductor-based microprocessors, and/or other hardware devices suitable for retrieval and execution of instructions stored in machine-readable storage medium, 504. The one or more hardware processor 502 may fetch, decode, and execute instructions, such as instructions 506-510, to control processes or operations for effectuating error detection and control in the context of coherency directory caches in accordance with one embodiment. As an alternative or in addition to retrieving and executing instructions, the one or more hardware processors 502 may include one or more electronic circuits that include electronic components for performing the functionality of one or more instructions, such as a field programmable gate array (FPGA), application specific integrated circuit (ASIC), or other electronic circuits.

The one or more hardware processors 502 are configured to execute instructions stored on a machine-readable medium 504. Machine readable medium 504 may be one or more types of non-transitory computer storage mediums. Non-limiting examples include: flash memory, solid state storage devices (SSDs); a storage area network (SAN); removable memory (e.g., memory stick, CD, SD cards, etc.); or internal computer RAM or ROM; among other types of computer storage mediums. The instructions stored on the machine-readable medium 504 may include various sub-instructions for performing the function embodied by the identified functions. For example, the instruction "receive coherency directory cache operation request" may include various sub-instructions for receiving, by a node controller, one or more coherency directory cache operation requests from a plurality of local processors and node controllers from other nodes within a multiprocessor system in a manner discussed with respect to FIGS. 1-4B above.

The one or more hardware processors 502 may execute instruction 506 to determine at least one of state and ownership of a memory block identified in a memory operation request. Recognizing that that memory is typically allocated to applications in block sizes larger than a single cache line making, it is likely that multiple memory blocks/cache lines have the same state and ownership characteristics, and will be requested eventually if a request for a first cache and likely associated cache line is received. For example, a coherency directory, e.g. a coherency directory cache of a node controller may be checked to determine state and ownership associated with a memory block/cache line.

The one or more hardware processors 502 may execute instruction 508 to modify the memory operation request from a memory operation request regarding a single memory block memory operation request to a block group memory operation request. As alluded to above, various embodiments are directed to making proactive/speculative requests as a group request. For example, receiving a memory operation request at a local processor socket, where remote messaging is to be performed in order to execute/facilitate that read a block group request can be sent instead of a single request. That is, requests for multiple memory blocks/cache lines that have the same or are likely to have the same state and ownership of the actually requested memory block/cache line are also sent to the remote node. In this way, requests for those as-of-yet-unrequested memory blocks/cache lines will have already been retrieved via a single request operation, rather than multiple request operations that would introduce latency and consume bandwidth.

The one or more hardware processors 502 may execute instruction 510 to transmit the modified memory operation request to a remote node from a node receiving the memory operation request.

Figure 6:
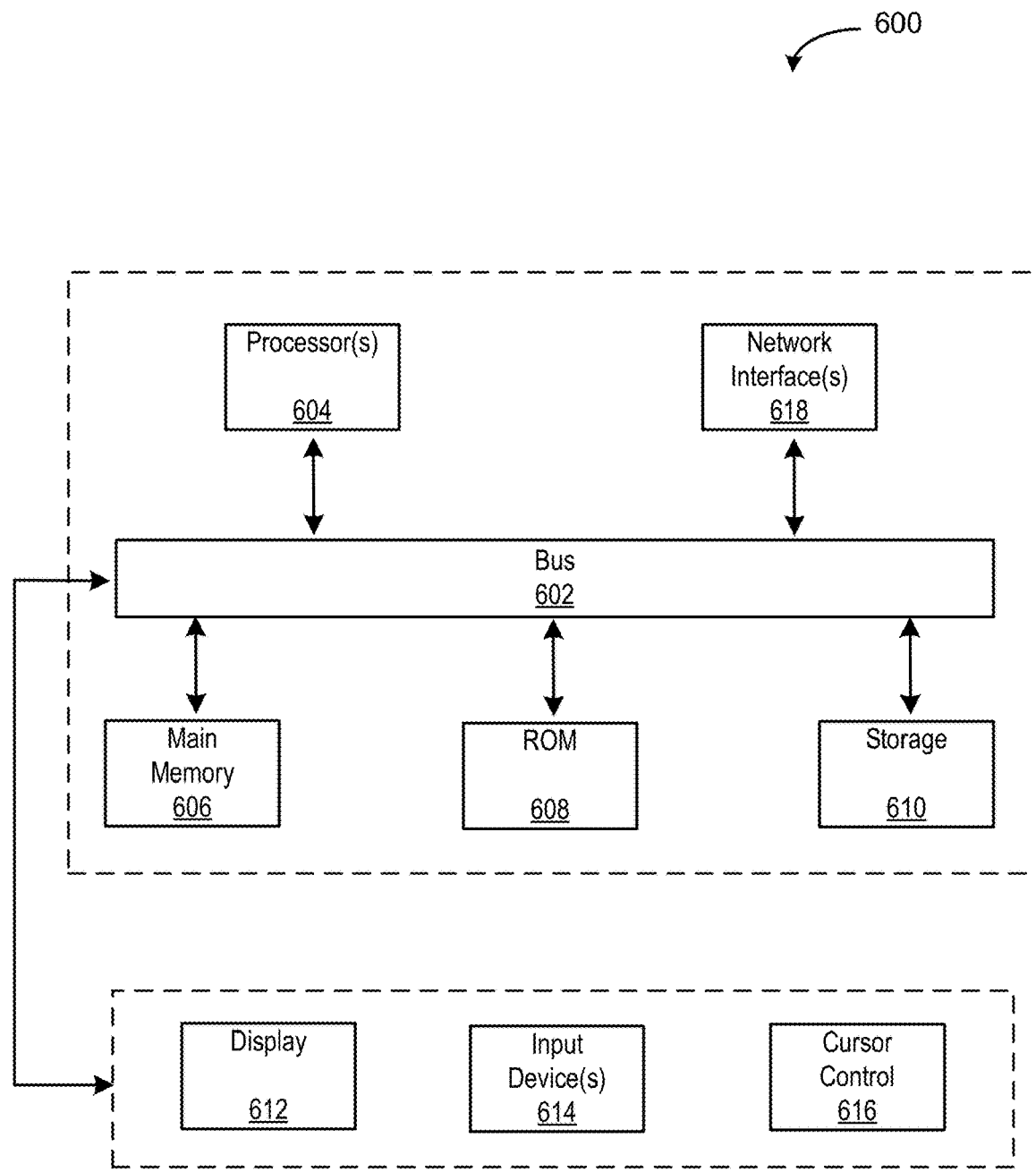
FIG. 6 is an example computing system in which embodiments described in the present disclosure may be implemented.

FIG. 6 depicts a block diagram of an example computer system 600 in which variations of the embodiments described herein may be implemented. The computer system 600 includes a bus 602, network, crossbar or other communication interconnect mechanism for communicating information, one or more hardware processors 604 coupled with bus 602 for processing information. Hardware processor(s) 604 may be, for example, one or more general purpose microprocessors. In various embodiments, the one or more hardware processors 604 may execute non-transitory machine-readable instructions to perform the various functions of the embodiments discussed with respect to FIGS. 1-3 and 4A-4C.

The computer system 600 also includes a main memory 606, such as a random access memory (RAM), cache and/or other dynamic storage devices, coupled to bus 602 or other communication interconnect mechanism for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 or other communication interconnect mechanism for storing static information and instructions for processor 604. A storage device 610, such as a magnetic disk, optical disk, or USB thumb drive (Flash drive), etc., is provided and coupled to bus 602 for storing information and instructions.

The computer system 600 may further include a display 612, input device 614, and/or a cursor control 616 coupled to bus 602 or other communication interconnect mechanism for displaying, communicating, and entering information and/or commands. In some embodiments, the same direction information and command selections as cursor control may be implemented via receiving touches on a touch screen without a cursor. The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. In various embodiments, such instructions may be similar to those discussed with respect to FIG. 5. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infrared data communications.

The computer system 600 also includes a communication interface 618 coupled to bus 602 or other communication interconnect mechanism for enabling two way communication with one or more networks over one or more network links. For example, communication interface 618 may be an integrated services digital network (ISDN) card, cable modem, satellite modem, a modem to provide a data communication connection to a corresponding type of telephone line, a local area network (LAN), a wide area network, or one or more types of wireless communication links.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the figures accompanying this disclosure and described in the preceding sections are provided for illustrative purposes only, and should not be interpreted as limiting the scope of the present disclosure. The scope of this disclosure is governed by the claims attached hereto and similar embodiments as would be within the ordinary skill of the art, using the same or equivalent elements. The omission of common components, circuits, devices, machines, or other elements which are known in the art to be present in apparatuses and devices in accordance with the present disclosure does not constitute such components falling outside the scope of this disclosure. A person of ordinary skill in the art knows how such common components are utilized and can understand the subject matter without specific recitation of these common components.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing"

environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, circuitry might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

In common usage, the term "or" should always be construed in the inclusive sense unless the exclusive sense is specifically indicated or logically necessary. The exclusive sense of "or" is specifically indicated when, for example, the term "or" is paired with the term "either," as in "either A or B." As another example, the exclusive sense may also be specifically indicated by appending "exclusive" or "but not both" after the list of items, as in "A or B, exclusively" and "A and B, but not both." Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A local node controller, comprising:
   one or more processors; and
   a memory unit operatively connected to the one or more processors, the memory unit including instructions that when executed, cause the one or more processors to:
      upon receipt of a memory operation request directed to a remote node, the memory operation request for information stored in single memory block of the remote node, determine at least one of state and ownership of the single memory block identified in the memory operation request;
      modify the received request from the single memory block memory operation request to a block group memory operation request including multiple memory operation requests for information stored in one or more additional memory blocks having at least one of common ownership and common state with the single memory block, the one or more additional memory blocks not yet being associated with one or more additional memory operation requests; and
      transmit the block group memory operation request to the remote node.

2. The local node controller of claim 1, wherein the memory unit includes instructions that when executed, further cause the one or more processors to determine if the information associated with the single memory block already exists in a local first-in-first-out cache.

3. The local node controller of claim 2, wherein the memory unit includes instructions that when executed, further cause the one or more processors to forward the information to a local processor socket managed by the local node controller.

4. The local node controller of claim 1, wherein the memory unit includes instructions that when executed, further cause the one or more processors to:
   receive the information stored in the single memory block of the remote node and the information stored in the one or more additional memory blocks;
   forward the information stored in the single memory block to the local processor socket; and
   maintain the information stored in the one or more additional memory blocks in a local first-in-first-out cache.

5. The local node controller of claim 4, wherein the memory unit includes instructions that when executed, further cause the one or more processors to discard oldest information of the information maintained in the local first-in-first-out cache upon all tracking locations becoming full.

6. The local node controller of claim 4, wherein the memory unit includes instructions that when executed, further cause the one or more processors to discard oldest information of the information maintained in the local first-in-first-out cache depending on at least one of current and past state of the oldest information.

7. The local node controller of claim 4, wherein the memory unit includes instructions that when executed, further cause the one or more processors to discard oldest information of the information maintained in the local first-in-first-out cache remaining unrequested.

8. The local node controller of claim 1, wherein the memory unit includes instructions that when executed, further cause the one or more processors to determine a number of the one or more additional memory operation requests to group in the block group memory operation request based on at least one of the ownership and the state of the one or more additional memory blocks.

9. The local node controller of claim 1, wherein the memory unit includes instructions that when executed, further cause the one or more processors to indicate whether the memory operation request for the information stored in the single memory block remains pending or actually requested.

10. The local node controller of claim 1, wherein the memory unit includes instructions that when executed, further cause the one or more processors to indicate whether the one or more additional memory operation request for the information stored in the one or more additional memory blocks remains pending or actually requested.

11. A node controller, comprising:
one or more processors; and
a memory unit operatively connected to the one or more processors, the memory unit including instructions that when executed, cause the one or more processors to:
determine if a memory operation request has been received from a local processor socket;
in response to a determination that a memory operation request has been received from a local processor socket, determine if a message to a remote node is needed to satisfy the memory operation request; and
in response to a determination that a message to a remote node is needed to satisfy the memory operation request, transmit a block group memory operation request including speculative memory operation requests in addition to the memory operation request received from the local processor socket.

12. The node controller of claim 11, wherein the memory unit includes instructions that when executed, further cause the one or more processors to, in response to the determination that a message to a remote node is needed, determine if information responsive to the memory operation request is pending.

13. The node controller of claim 12, wherein the speculative memory operation requests include information stored in consecutive cache lines relative to a cache line in which information that is a target of the received memory operation request is stored, the information stored in the consecutive cache lines being least one of commonly owned with the information that is the target of the received memory operation request and being in a common state with the information that is the target of the received memory operation request.

14. The node controller of claim 11, wherein the memory unit includes instructions that when executed, further cause the one or more processors to track a status of the memory operation request using a tracking entry maintained in tracking space.

15. The node controller of claim 14, wherein the instructions that when executed, further cause the one or more processors to track the status of the memory operation request further cause the one or more processors to mark each of the received memory operation request and the speculative memory operation requests as pending.

16. The node controller of claim 11, wherein the memory unit includes instructions that when executed, further cause the one or more processors to determine if information that is a target of the received memory operation request is pending or already received in a first-in-first-out queue of a node controlled by the node controller.

17. The node controller of claim 16, wherein the memory unit includes instructions that when executed, further cause the one or more processors to transmit the information to the local processor socket, and update a tracking status of the received memory operation request.

18. The node controller of claim 17, wherein the instructions that when executed, cause the one or more processors to update the tracking status further causes the one or more processors to update a tracking space within which tracking status of the received memory request and tracking status of the speculative memory operation requests are maintained based at least relative to time in the tracking space and availability of the tracking space.

19. The node controller of claim 11, wherein the memory unit includes instructions that when executed, further cause the one or more processors to store a response to the speculative memory operation requests in a first-in-first-out queue.

20. The node controller of claim 19, wherein the memory unit includes instructions that when executed, further cause the one or more processors to transmit a response to each of the speculative memory operation requests as the speculative memory operation requests become actual, additional memory operation requests.

\* \* \* \* \*